United States Patent
Bivens et al.

(10) Patent No.: US 6,213,454 B1
(45) Date of Patent: Apr. 10, 2001

(54) REVERSE AIR DAMPER WITH LATCHING MECHANISM

(75) Inventors: Steven L. Bivens, Kankakee; Calvin Derr, Chicago; Joseph Wach, Ingleside, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/282,728

(22) Filed: Mar. 31, 1999

(51) Int. Cl.$^7$ .......................................................... F16F 9/56
(52) U.S. Cl. ........................ 267/64.12; 188/300; 267/34; 267/221
(58) Field of Search ................................... 267/64.12, 34, 267/221, 120, 64.11; 188/300, 67, 281; 16/66, 84; 292/145, 137, DIG. 4, 163, 165, 166, 169, 169.11, 169.18, 358, 170; 296/37.9; 312/332

(56) References Cited

U.S. PATENT DOCUMENTS

| 3,055,204 | 9/1962 | Pelcin . |
| 3,869,159 | 3/1975 | Eads . |
| 3,918,754 | 11/1975 | Isbister . |
| 4,527,821 | 7/1985 | Tanaka . |
| 5,031,942 | 7/1991 | Harrod . |
| 5,157,953 | 10/1992 | Hung . |
| 5,516,163 | 5/1996 | Baker . |
| 5,518,223 | * 5/1996 | Bivens ............................. 267/64.12 |
| 5,577,780 | 11/1996 | Justice . |
| 5,647,578 | * 7/1997 | Bivens ............................. 267/64.12 |
| 5,657,969 | * 8/1997 | Bivens ............................. 267/64.12 |
| 6,056,333 | * 5/2000 | Wach . |

* cited by examiner

Primary Examiner—Douglas C. Butler
(74) Attorney, Agent, or Firm—Pitney, Hardin, Kipp & Szuch LLP

(57) ABSTRACT

The damper includes a piston assembly which travels within a cylindrical damper housing between an extended position and a retracted position. A transverse channel is formed proximate to the open end of the damper housing. A latching diamond travels within the transverse channel. The piston assembly includes a piston shaft with a camming wall sub-assembly formed thereon which engages the latching diamond so that the piston assembly is latched in a "push-push" configuration in the extended position. In this latched configuration, the latching diamond is detent engaged by a concave detent apex formed on an island which includes a longitudinally chamfered portion. Additionally, the flexibility of the island in which the concave detent apex is formed may be increased by transverse passageways or "cored-out" areas in the piston shaft immediately adjacent to the island. While the open latched configuration is normally released by incrementally extending and then releasing the piston assembly, it is possible that a user will attempt to release the open latched configuration by urging the piston assembly toward the retracted position. In this case, the island flexes and the latch diamond travels over a longitudinally chamfered portion of the concave detent apex free of damage to the island, the latch diamond, and other portions of the damper.

11 Claims, 3 Drawing Sheets

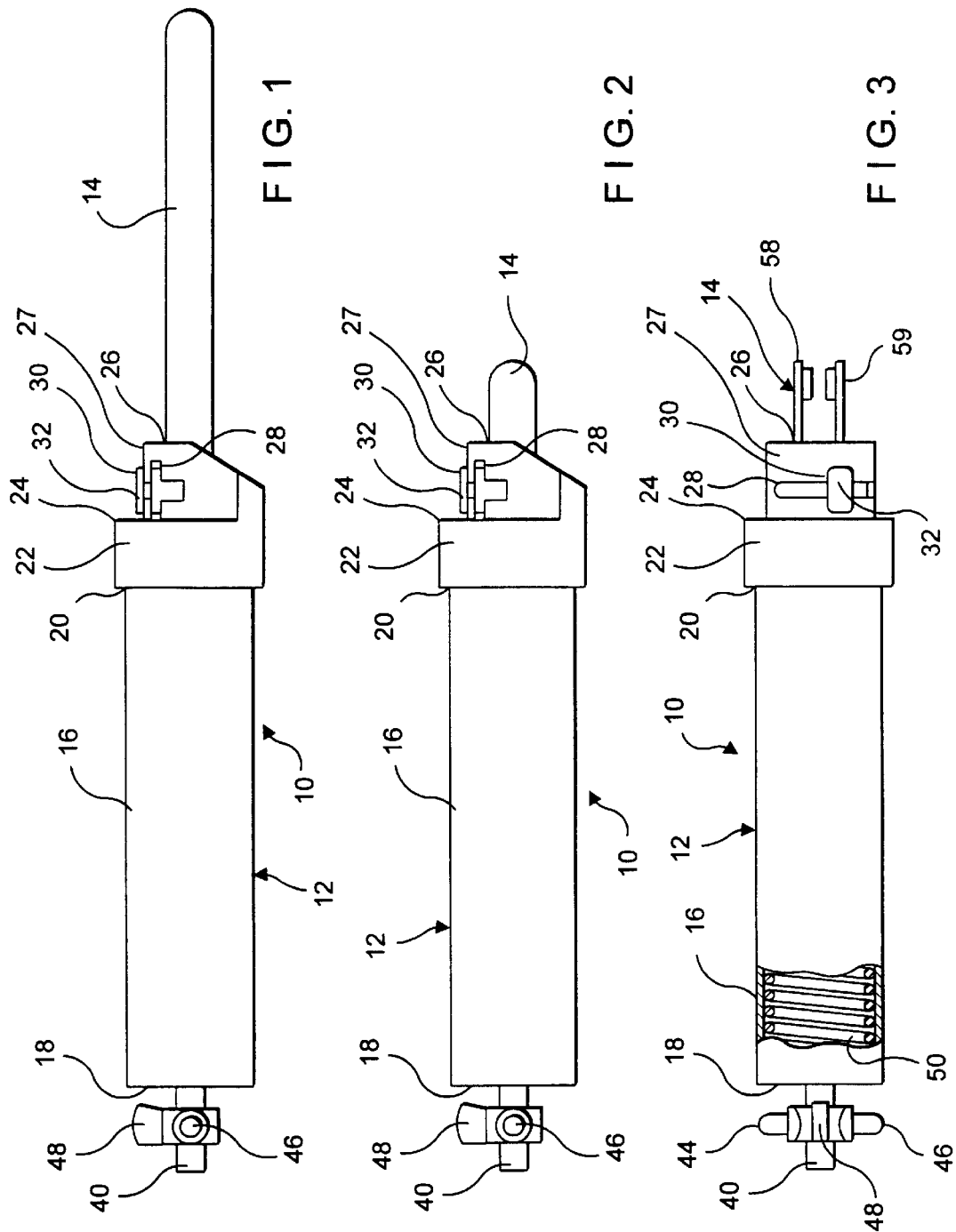

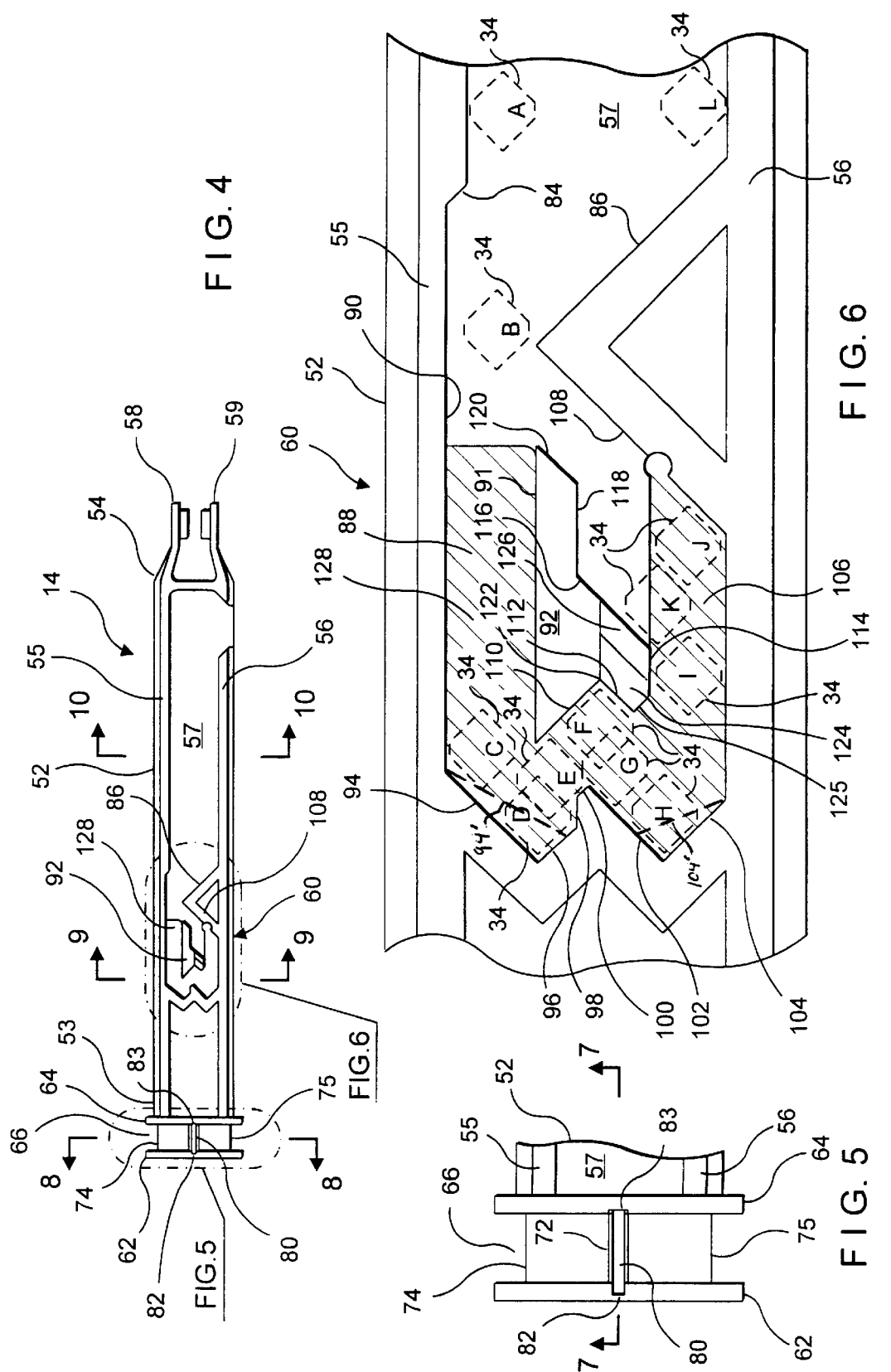

REVERSE AIR DAMPER WITH LATCHING MECHANISM

BACKGROUND OF THE INVENTION

1. Field of the Invention

This invention pertains to a damper, particularly for an automotive applications, such as cupholders and ashtrays, which includes a reverse air damper and a latching mechanism. The latching mechanism has been adapted for structural flexibility and can compensate for improper operation.

2. Description of the Prior Art

In the prior art, it is known to use a damper for automotive applications, such as cupholders and ashtrays. Latches similar to a "push-push" mechanism, configured to be pulled instead of pushed, have not been satisfactory for such applications as the latch diamond has been likely to shear and destroy the latch mechanism if the latch was forced the wrong way during operation. While secondary springs have been used to compensate for improper operation of the latch, this has increased the cost and complexity of the latch, and has not been satisfactory.

Additionally, current latch mechanisms of this type have required an excessive amount of over-travel to activate. Similarly, current latch mechanisms of this type have required excessive latch diamond travel during the activation and deactivation cycle.

Current latch mechanisms of this type have not had sufficient structural flexibility.

OBJECTS AND SUMMARY OF THE INVENTION

It is therefore an object of this invention to provide a damper with a "push-push"-type latch, particularly for automotive applications, which can compensate for improper operation, that is, being forced in the wrong direction, without damage to the latch.

It is therefore a further object of this invention to provide a damper with a "push-push"-type latch, particularly for automotive applications, which does not require the use of secondary springs to compensate for improper operation.

It is therefore a still further object of this invention to provide a damper with a "push-push"-type latch, particularly for automotive applications, which reduces the amount of over-travel required for operation.

It is therefore a still further object of this invention to provide a damper with a "push-push"-type latch, particularly for automotive applications, which reduces the travel of the latch diamond during operation.

It is therefore a still further object of this invention to provide a damper with a "push-push"-type latch, particularly for automotive applications, which has increased structural flexibility.

These and other objects are provided by a damper with a damper housing and a piston assembly which travels within the damper housing. The piston assembly includes directionally-dependent damping so that the piston assembly movement is damped during retraction, but is substantially undamped during extension (that is, "reverse damping"). The damper housing includes a transverse channel through which a latch diamond travels. The piston assembly includes a "push-push" latching cam sub-assembly which is engaged by the latch diamond when the piston assembly is in an extended position. The latch diamond is disengaged from the latching cam sub-assembly by further extension of the piston assembly followed by release of the piston assembly.

A coil spring within the damper housing urges the piston assembly to a retracted position after the latch diamond is disengaged from the latching cam sub-assembly.

The latching cam sub-assembly includes a detent section which has been chamfered in the longitudinal direction to allow the latch diamond to travel over the detent section without damage in the event that the damper is forced in the wrong direction when the "push-push" latch mechanism is engaged.

The latching cam sub-assembly further includes cored out section in order to increase the flexibility of the detent section and of the piston assembly.

BRIEF DESCRIPTION OF THE DRAWINGS

Further objects and advantages of the invention will become apparent from the following description and claims, and from the accompanying drawings, wherein:

FIG. 1 is a side plan view of the damper of the present invention with the piston assembly in the extended position.

FIG. 2 is a side plan view of the damper of the present invention with the piston assembly in the retracted position.

FIG. 3 is a top plan view of the damper of the present invention with the piston assembly in the retracted position, with a portion of the damper housing in phantom to show the spring.

FIG. 4 is a top plan view of the piston assembly of the present invention.

FIG. 5 is a side plan view of the piston section of the piston assembly of the present invention.

FIG. 6 is a side plan view of the latching cam sub-assembly of the piston assembly of the present invention, illustrating the various positions (A–L) of the latch diamond during "push-push"-type operation.

DETAILED DESCRIPTION OF THE PREFERRED EMBODIMENT

Figure 7:
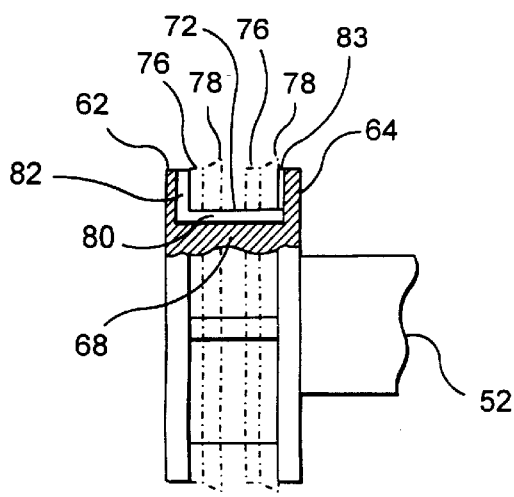
FIG. 7 is a cross-sectional view along plane 7—7 of FIG. 5.

Referring now to the drawings in detail wherein like numerals refer to like elements throughout the several views, one see that FIGS. 1 and 2 are side plan views of the damper 10 of the present invention in the extended and retracted positions, respectively.

Damper 10 includes damper housing 12 and piston assembly 14. Damper housing 12 is formed of cylindrical walls 16 with closed end 18 and open end or mouth 20. Open end 20 is engaged by collar 22 of cap 24. Cap 24 further includes central aperture 26 through which piston assembly 14 travels. A longitudinally outward portion of cap 24 includes planar support 27 through which transverse channel 28 is formed. Latch diamond sub-assembly 30 reciprocates within transverse channel 28. The exterior tab 32 of latch diamond sub-assembly 30 is illustrated on FIGS. 1–3 and is integral with the interior latch diamond 34 which is illustrated in various positions A–L in FIG. 6. The operation of latch diamond 34 will be explained in detail hereinafter.

Longitudinal threaded element 40 passes through the center of closed end 18 of damper housing 12. Longitudinal threaded element 40 threadedly engages transverse connector 42 which includes opposed detent cylindrical elements 44, 46 and detent bar 48 perpendicular to opposed detent cylindrical elements 44, 46. Opposed detent cylindrical elements 44, 46 and detent bar 48 serve to fasten damper 10 to a relatively fixed structure, such as an automotive instrument panel (not shown). Additionally, longitudinal threaded element 40 is attached to a first end of coil spring 50 which is coiled within damper housing 12 (see FIG. 3). The second end of spring 50 is attached to piston assembly 14 thereby biasing piston assembly 14 toward a retracted position.

Figure 8:
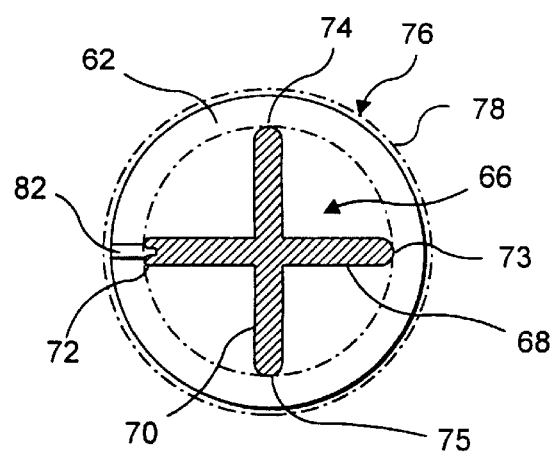
FIG. 8 is a cross-sectional view along plane 8—8 of FIG. 4.
Figure 9:
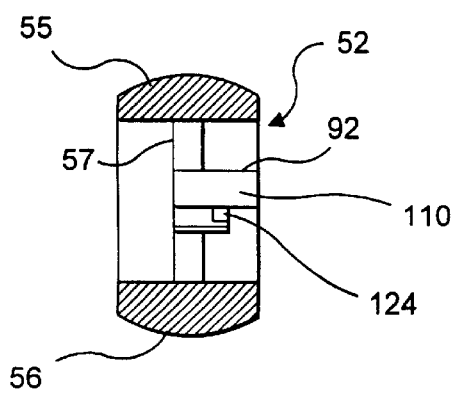
FIG. 9 is a cross-sectional view along plane 9—9 of FIG. 4.
Figure 10:
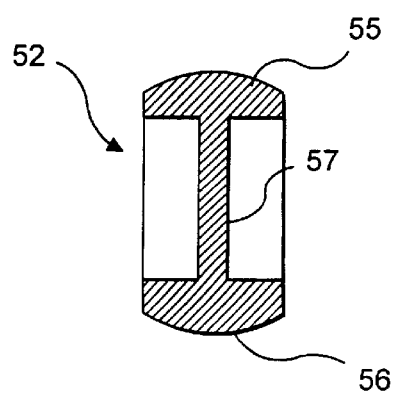
FIG. 10 is a cross-sectional view along plane 10—10 of FIG. 4.

Piston assembly 14 is illustrated in FIG. 4, with various details illustrated in FIGS. 5–10. Piston assembly 14 includes piston shaft 52 with proximal end 53 and distal end 54. As shown in FIG. 10, piston shaft 52 has a I-beam type cross section formed by upper and lower horizontal members 55, 56 and a central vertical member 57 ("horizontal" and "vertical" referring to the illustrated orientation). This provides for a degree of horizontal deflection and minimal vertical deflection of piston shaft 52. Distal end 54 of piston shaft 52 includes opposed arms 58, 59 which are attached typically to a relatively moveable structural component, such as an ashtray or cupholder (not shown). Latching cam sub-assembly 60 is formed at a central portion of piston shaft 52 and, as described hereinafter, is engaged by latch diamond 34 when piston assembly 14 is in the extended position. Proximal end 53 of piston shaft 52 is formed by leading disk 62 separated from trailing disk 64 by spacer 66. Spacer 66, as shown in FIG. 8, includes planar portions 68, 70 which are oriented in a longitudinal and radial direction forming an "X" cross section. Planar portions 68, 70 include distal ends 72, 73 and 74, 75, respectively which terminate inwardly adjacent from the periphery of leading disk 62 and trailing disk 64. Toroidal seal 76, with outwardly extending lip 78, is positioned between leading disk 62 and trailing disk 64. As shown in phantom in FIG. 7, toroidal seal 76 has an inner diameter to engage and travel upon distal ends 72, 73, 74, 75 (see FIG. 7 wherein toroidal seal 76 is shown in phantom at the two extremes of the range of travel thereof). Lip 78 of toroidal seal 76 has an outer diameter greater than that of leading and trailing disks 62, 64 so as to sealing engage the interior of damper housing 12. Leading and trailing disks 62, 64 preferably do not form a sealing engagement with the interior of damper housing 12.

As shown in FIGS. 7 and 8, a radially outward facing portion of distal end 72 further includes selective air communication groove 80. While the illustrated embodiment includes selective air communication groove 80 on a single distal end 72, selective air communication groove 80 could be included on multiple distal ends. Selective air communication groove 80 is in communication with increased air communication groove 82 cut into leading disk 62, extending from selective air communication groove 80 to a peripheral edge of leading disk 62. Selective air communication groove 80 may also be in communication with reduced air communication groove 83. Reduced air communication groove 83 is cut into trailing disk 64, extending from selective air communication groove 80 to a peripheral edge of leading disk 62. In order to achieve the "reversed" directionally dependent damping, reduced air communication groove 83 must be of less depth (or at least reduced cross sectional area with attendant increased air flow resistance) with respect to increased air communication groove 82 and selective air communication groove 80. Indeed, reduced air communication groove 83 may even be eliminated in order to achieve the greatest directional dependence of the damping.

As piston assembly 14 is withdrawn from damper housing 12, toroidal seal 76 slides to the leftward position against leading disk 62 as shown in FIG. 7. This allows air communication from the inner diameter of damper housing 12 to piston shaft 52 through increased air communication groove 66 and selective air communication groove 80. This air communication eliminates or substantially reduces damping in this position of toroidal seal 76.

As piston assembly 14 is retracted into damper housing 12, however, toroidal seal 76 slides to the rightward position against trailing disk 64 as shown in FIG. 7. This allows air communication from the inner diameter of damper housing 12 to piston shaft 52 through selective air communication groove 80 and reduced air communication groove 83. The increased air flow resistance of reduced air communication groove 83 provides increased damping in this position. Damping in this position can be increased by reducing the depth of reduced air communication groove 83 or even eliminating reduced air communication groove 83.

As the directionally dependent damping is increased when the piston assembly 14 is retracted into damper housing 12, rather than the conventional configuration with increased damping when the piston assembly 14 is withdrawn from damper housing 12, this configuration is considered to be "reverse damping".

Latching cam sub-assembly 60, which is formed on piston shaft 52 and which is engaged by latch diamond 34 when piston assembly 14 is in the extended position is illustrated in detail on FIG. 6. Latching cam sub-assembly 60 is formed on vertical member 57 of the I-beam configuration of piston shaft 52 between upper and lower horizontal members 55, 56. Mouth 84 of latching cam sub-assembly 60 is formed between upper and lower horizontal members 55, 56 for receiving latch diamond 34. Oblique mouth camming wall 86 extends from lower horizontal member 56 inwardly into mouth 84 in order to direct latch diamond 34 into entry channel 88 which is formed between indented portion 90 of upper horizontal member 55 and upper edge 91 of island 92. Entry channel 88 leads to first upper interior oblique camming wall 94 which joins second upper interior oblique camming wall 96 at a right angle. Modified first upper interior oblique camming wall 94' (illustrated as a dashed line) joins upper interior oblique camming wall 96 at greater than a right angle and functions to reduce the travel required to latch and unlatch damper 10. Central interior horizontal camming wall 98 extends from second upper interior oblique camming wall 96 to apex 100. First lower interior oblique camming wall 102 extends downwardly from apex 100 and joins second lower interior oblique camming wall 104 at a right angle. Second lower interior oblique camming wall 104 extends to join lower horizontal member 56. Modified second lower interior oblique camming wall 104' (illustrated as a dashed line) joins first lower interior oblique camming wall 102 at greater than a right angle and functions to reduce the travel required to latch and unlatch damper 10. Exit channel 106 is formed between island 92 and lower horizontal member 56 and leads to exit channel oblique camming wall 108. Exit channel oblique camming wall 108 is formed at a right angle with oblique mouth camming wall 86.

Island 92 is bounded by upper edge 91, upper oblique island camming wall 110, lower oblique island camming wall 112, lower edge 114, first oblique island cut-out wall 116, lower cut-out edge 118, and second oblique island cut-out 120 as shown in FIG. 6. The intersection of upper and lower oblique island camming walls 110, 112 forms concave detent island apex 122. In order for latching cam sub-assembly to function properly, it is important that concave detent island apex 122 is formed at a lower level (from the orientation shown in FIG. 6) than apex 100.

Figure 11:
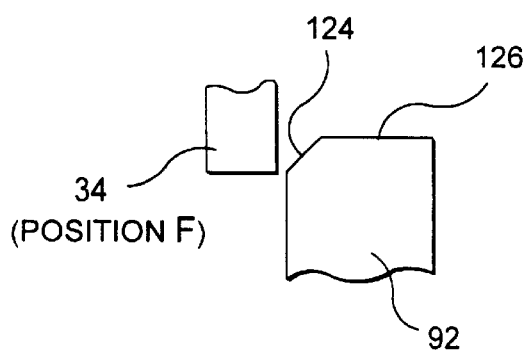
FIG. 11 is a cross-sectional side view of the latch diamond engaging the latching cam sub-assembly during the normal latching operation of the present invention.
Figure 12:
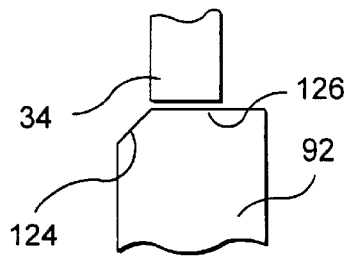
FIG. 12 is a cross-sectional side view of the latch diamond riding over the chamfered portion of the latching cam sub-assembly when the piston assembly of the present invention is forced in the wrong direction in the latched position.

The area between lower oblique island camming wall 112 and first oblique island cut-out wall 116, illustrated at a height not extending beyond the level of concave island apex 122, includes longitudinally chamfered section 124 and unchamfered section 126 (also see FIGS. 9, 11 and 12). Longitudinally chamfered section 124 further includes oblique blunted point 125.

Horizontal element 57 includes a cored-out or hollow area 128 (shown as hatched in FIG. 6) in the areas of entry channel 88, exit channel 106 and the area between island 92 and walls 94, 96, 102, 104. Cored-out or hollow area 128, formed by a transverse passageway through horizontal element 57, creates a "floating island" or "floating latch" configuration allowing island 92 to deflect as will be described hereinafter.

As piston assembly 14 is withdrawn from damper housing 12, latch diamond 34, which has a vertical position between relative positions A and L of FIG. 6 depending upon the location of latch diamond sub-assembly 30 within transverse channel 28, is guided into mouth 57 and further guided by oblique mouth camming wall 86 to relative position B (the term "relative position" is used as vertical movement of latch diamond 34 as shown in FIG. 6 results from the travel of latch diamond sub-assembly 30 within transverse channel 28 while the retraction and extension of piston assembly 14 result in the illustrated changes in relative horizontal positions of latch diamond 34). Further withdrawal of piston assembly 14 results in latch diamond 34 passing through entry channel 88 to relative position C. Thereafter, first upper interior oblique camming wall 94 guides latch diamond 34 to relative position D thereby inhibiting any further withdrawal of piston assembly 14. The user then releases the ashtray or cupholder (not shown) or other relatively moveable structural device. This causes spring 50 to incrementally retract piston assembly 14 thereby urging latch diamond to relative position E as limited by central interior horizontal camming wall 98. Further retraction of piston assembly 14 by spring 50 causes latch diamond 34 to be urged by upper oblique camming wall 110 to relative position F to be detent engaged by concave island apex 122. The detent engagement of relative position F inhibits further retraction of piston assembly 14 (this inhibition is capable of being overcome with sufficient improper force, as described hereinafter) and results in the damper 10 (and hence the ashtray, cupholder 'not shown' or other similar relatively moveable member) being latched open. In order for the user to release the detent engagement properly, the user incrementally extends piston assembly 14 further from damper housing 12 (the "push-push" terminology will be maintained notwithstanding the damper 10 being configured for pulling) so that latch diamond 34 is urged to relative position G and guided by first lower oblique camming wall 102 to relative position H. As previously described, in order to assure that latch diamond 34 is guided from relative position F to relative positions G and H, rather than back to relative positions D and E, it is important that concave detent island apex 122 is formed at a lower level (from the orientation shown in FIG. 6) than apex 100. The user then releases piston assembly 14 (or the attached relatively moveable structural device, such as an ashtray, cupholder 'not shown', or other similar structure) and spring 50 retracts piston assembly 14 back into damper housing 12. This, along with some vertical urging by oblique blunted point 125, results in latch diamond 34 being urged from relative position H to relative position I. Further retraction of piston assembly 14 causes latch diamond to travel from relative position I to relative position J through exit channel 106. Exit channel oblique camming wall 108 then urges latch diamond 34 to relative position B. Finally, retraction of piston assembly 14 causes latch diamond 34 to travel to relative position A and further outward as damper 10 returns to the retracted position of FIG. 2.

If a user improperly forces piston assembly 14 to retract from relative position F as illustrated in FIGS. 6 and 11, latch diamond 34 passes over longitudinally chamfered section 124 and unchamfered section 126 by deflecting island 92 and associated structures downwardly as shown in FIG. 12. The cored-out or hollow area 128 of horizontal section 57 aids in this deflection. This results in latch diamond 34 passing to relative position K of FIG. 6 without damage to latch diamond 34 or any other element of damper 10. Spring 50 causes further retraction of piston assembly 14 and latch diamond 34 follows a similar path to relative positions B and A as described hereinabove.

The small horizontal distance between position F and either of positions D or H of FIG. 6 illustrate the small amount of over-travel required by the operation of damper 10.

In order to install damper 10, the user typically attaches transverse connector 42 to a relatively fixed structure, such as an automotive instrument panel (not shown) and attaches opposed arms 58, 59 of piston assembly 14 to a relatively moveable structure, such as an ashtray, cupholder (not shown) or similar structural device.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A damper comprising:
   a damper housing including sidewalls, an open end and a closed end;
   said damper housing further including a latching protrusion traveling within a guide proximate to said open end, said guide being transverse to said damper housing; and
   a piston assembly traveling within said damper housing between a retracted position and an extended position with respect to said damper housing, said piston assembly including a piston shaft with a proximal end and a distal end, said proximal end including a piston, said piston shaft including a camming wall sub-assembly for engaging said latching protrusion thereby detent engaging said piston assembly in said extended position with respect to said damper housing wherein said camming wall sub-assembly includes camming walls surrounding an island, said island including a concave detent apex, further when said piston assembly is extended, said camming walls engage said detent protrusion to a first relative position which inhibits further extension of said piston assembly; upon subsequent incremental retraction of said piston assembly from said first relative position, said camming walls urge said detent protrusion to a second relative position wherein said detent protrusion is engaged by said concave detent apex which inhibits further retraction of said piston assembly; upon subsequent incremental extension of said piston assembly from said second relative position, said camming walls urge said detent protrusion to a third relative position which inhibits further extension of said piston assembly; whereby said piston assembly can freely retract when said detent protrusion is in said third relative position.

2. The damper of claim 1 wherein at least a portion said concave detent apex includes a longitudinally chamfered section, whereby if said piston assembly is retracted with sufficient force from said second relative position to overcome inhibition of retraction, at least one of said island and said detent protrusion flexes sufficiently to permits said detent protrusion to travel across said longitudinally chamfered section free from damaging the damper.

3. The damper of claim 2 wherein said piston assembly freely retracts after said detent protrusion travels across said longitudinally chamfered section.

4. The damper of claim 3 wherein said piston shaft includes transverse passageways to increase flexibility of said island with respect to said piston shaft.

5. The damper of claim 4 wherein said transverse passageways are immediately adjacent to said island.

6. The damper of claim 5 wherein said piston assembly is biased to said retracted position by a spring within said damper housing.

7. The damper of claim 6 wherein piston includes means for damping movement of said piston assembly.

8. The damper of claim 7 wherein said means for damping is dependent upon a direction of travel of said piston assembly.

9. The damper of claim 8 wherein said means for damping has relatively increased damping as said piston assembly moves toward said retracted position.

10. The damper of claim 9 wherein said means for damping includes a seal which allows greater air communication when said piston assembly moves toward said extended position than when said piston assembly moves toward said retracted position.

11. The damper of claim 10 wherein said camming walls which inhibit further extension of said piston assembly in said first relative position meet at an angle exceeding ninety degrees and wherein said camming walls which inhibit further extension of said piston assembly in said third relative position meet at angle exceeding ninety degrees.

* * * * *